US012440750B1

(12) United States Patent
Xiao

(10) Patent No.: US 12,440,750 B1
(45) Date of Patent: Oct. 14, 2025

(54) MULTIFUNCTIONAL JIGSAW PUZZLE BOARD FOR CHILDREN

(71) Applicant: Jiayi Xiang, Ji'an (CN)

(72) Inventor: Yanhua Xiao, Ji'an (CN)

(73) Assignee: Jiayi Xiang, Ji'an (CN)

( * ) Notice: Subject to any disclaimer, the term of this patent is extended or adjusted under 35 U.S.C. 154(b) by 0 days.

(21) Appl. No.: 19/185,320

(22) Filed: Apr. 22, 2025

(51) Int. Cl.
*A63F 9/10* (2006.01)
*B43L 1/04* (2006.01)
*B65D 25/04* (2006.01)
*B65D 25/28* (2006.01)

(52) U.S. Cl.
CPC ............ *A63F 9/1044* (2013.01); *B43L 1/045* (2013.01); *B65D 25/04* (2013.01); *B65D 25/2805* (2013.01)

(58) Field of Classification Search
None
See application file for complete search history.

(56) References Cited

U.S. PATENT DOCUMENTS 5,692,799 A * 12/1997 Sheets .................... A47B 85/04 297/124
2006/0214922 A1* 9/2006 Moore ...................... B43L 1/06 345/173
2021/0170268 A1* 6/2021 Malki ................... A63F 9/1044
2024/0335736 A1* 10/2024 Che ........................ F16M 11/08

* cited by examiner

*Primary Examiner* — James B Hull
(74) *Attorney, Agent, or Firm* — Nicholas Makridakis

(57) ABSTRACT

Disclosed is a multifunctional jigsaw puzzle board for children, including a jigsaw puzzle board body and a storage box; the jigsaw puzzle board body has an overall rectangular shape, a front of the jigsaw puzzle board body is provided with a jigsaw puzzle area for assembling jigsaw puzzle pieces, a rear of the jigsaw puzzle board body is provided with a chalkboard area for chalkboard writing, and the jigsaw puzzle board body is further provided with a mounting slot that opens outward; a support stand is foldably arranged on a side of the jigsaw puzzle board body; and the storage box is slidably arranged in the mounting slot and can be pulled outward, and the storage box is provided with a storage compartment for holding various items. The product perfectly combines jigsaw puzzle function and blackboard-writing function, and is convenient for use and storage.

9 Claims, 9 Drawing Sheets

MULTIFUNCTIONAL JIGSAW PUZZLE BOARD FOR CHILDREN

TECHNICAL FIELD

The present disclosure relates to the technical field of educational toys for children, and more particularly relates to a children's jigsaw puzzle board that combines jigsaw puzzle function and blackboard-writing functions, and is convenient for use and storage.

BACKGROUND

Most children's jigsaw puzzle products currently available on the market have limited functions, focusing solely on a puzzle-solving function. Once children complete the puzzle, entertainment value and practicality of the jigsaw puzzle products as toys diminished, making them easy to be idle.

Common children's chalkboards are usually standalone products and are not integrated with puzzle functions, they take up a larger space and fail to meet diverse creative needs of children. When switching between puzzling, doodling and writing, children need to prepare other various toys, which is inconvenient.

Most traditional jigsaw puzzle boards need to be lay flat during use. For younger children, leaning over to assemble jigsaw puzzle pieces for an extended period of time easily causes neck strain, and poor viewing angle during the puzzling will negatively affect the children's engagement and concentration. In addition, there are no dedicated compartments for storing jigsaw puzzle pieces, markers, and other accessories, making them easy to lose and causing inconvenience for parents during cleanup.

Therefore, it is necessary to work out a solution to address the above problems.

SUMMARY

In view of the foregoing problems, the present disclosure aims to solve the deficiencies in the prior art by providing a multifunctional jigsaw puzzle board for children, which perfectly combines jigsaw puzzle function and blackboard-writing function, thereby solving the problems of existing products, such as single function, inconvenience in use and difficulty in storage. Therefore, the jigsaw puzzle board of the present disclosure can provide children with richer, more enjoyable, convenient and comfortable learning and entertainment experience, while and also reduce the burden on parents in tidying up toys.

In order to achieve the foregoing objectives, the present disclosure adopts the following technical solution:

a multifunctional jigsaw puzzle board for children, including a jigsaw puzzle board body and a storage box; where the jigsaw puzzle board body is formed by four linearly extending edge portions, a first edge portion and a second edge portion are arranged opposite and parallel to each other, and a third edge portion and a fourth edge portion are also arranged opposite and parallel to each other; the four edge portions are connected end to end via four right-angle structures to form a closed geometric shape; an included angle between the first edge portion and the third edge portion is 90±0.5 degrees, and an included angle between the second edge portion and the fourth edge portion is also 90±0.5 degrees; a front of the jigsaw puzzle board body is provided with a jigsaw puzzle area for assembling jigsaw puzzle pieces, a rear of the jigsaw puzzle board body is provided with a chalkboard area for chalkboard writing, and the jigsaw puzzle board body is further provided with a mounting slot that opens outward; and the storage box is slidably arranged in the mounting slot and can be pulled outward, and the storage box is provided with a storage compartment for holding various items.

Preferably, the multifunctional jigsaw puzzle board for children further includes a support stand, where the support board is foldably arranged on a side of the jigsaw puzzle board body.

Preferably, the jigsaw puzzle board body includes a middle sandwich plate, a front cover plate, a front frame, a rear cover plate, and a rear frame; where a notch is formed on a peripheral edge of the middle sandwich plate; the front cover plate and the front frame are securely attached to a front of the middle sandwich plate, an outer surface of the front cover plate defines the jigsaw puzzle area, the front frame surrounds a periphery of the front cover plate, and an outer surface of the front frame protrudes beyond the outer surface of the front cover plate; and the rear cover plate and the rear frame are securely attached to a rear of the middle sandwich plate, an outer surface of the rear cover plate defines the chalkboard area, the rear frame surrounds a periphery of the rear cover plate, and the front cover plate, the front frame, the rear cover plate and the rear frame respectively cover front and rear openings of the notch to form the mounting slot.

Preferably, the front cover plate is made of a durable, smooth-surfaced, and eco-friendly plate.

Preferably, the outer surface of the rear cover plate is coated with magnetic chalkboard paint.

Preferably, the front frame and the rear frame are both injection-molded from plastic materials.

Preferably, a plurality of the notches are provided, and are spaced and distributed on the peripheral edge of the middle sandwich plate, and correspondingly, a plurality of the mounting slots are formed, and one storage box is arranged in each of the mounting slots.

Preferably, one recessed slot is formed on each of left and right sides of the rear of the jigsaw puzzle board body; and the support stand includes two support rods, the two support rods are respectively adapted to the two recessed slots, and can be arranged in the two recessed slots in a folded or unfolded manner, and a first end of each of the two support rods is hinged with the jigsaw puzzle board body via a respective pivot shaft.

Preferably, the storage box includes a box body and a handle; where the box body is integrally molded, and includes a base plate portion and a plurality of side plate portions, the plurality of side plate portions extend upward from respective edges of the base plate portion, and the plurality of side plate portions are connected end to end in sequence and enclosed to form the storage compartment; and the handle is fixed to an outer side face of the box body.

Preferably, a chalkboard hanging hole is formed on a front edge of the jigsaw puzzle board body.

Compared with the prior art, the present disclosure has obvious advantages and beneficial effects. Specifically, it can be seen from the above technical solution that:

by arranging a jigsaw puzzle area on the front, and a chalkboard area on the rear of the jigsaw puzzle board body, the product perfectly combines jigsaw puzzle function and blackboard-writing function, thereby meeting various fund and learning needs of children with a single product, increasing the utilization rate as a toy, and saving costs for parents to purchase various single-function toys. In addition, by introducing the support stand, the product can be adjusted to conform to ergonomic principles for children, effectively alleviating neck strain caused by bending down to assemble jigsaw puzzle pieces for an extended period of time, and improving the view of assembling jigsaw puzzle pieces, as well as comfort and concentration of children, and cultivating patience and concentration of children. In addition, by introducing the storage box, jigsaw puzzle pieces and accessories can be stored in the storage box to avoid loss, fostering good storage habits and maintaining a home environment tidier and more orderly. The product can be used both on the tabletop or hung on the wall, making it adaptable to different usage scenarios, and convenient for use in places living room, children's room, or classroom.

REFERENCE NUMERALS IN THE ACCOMPANYING DRAWINGS

10. jigsaw puzzle board body; 11. middle sandwich plate; 111. notch; 12. front cover plate; 13. front frame; 14. rear cover plate; 141. magnetic chalkboard paint; 15. rear frame; 101. jigsaw puzzle area; 102. chalkboard area; 103. mounting slot; 104. recessed slot; 105. chalkboard hanging hole; 20. support stand; 21. support rod; 22. pivot shaft; 30. storage box; 31. box body; 311. base plate portion; 312. side plate portion; 32. handle; and 301. storage compartment.

DETAILED DESCRIPTIONS OF THE EMBODIMENTS

Figure 1:
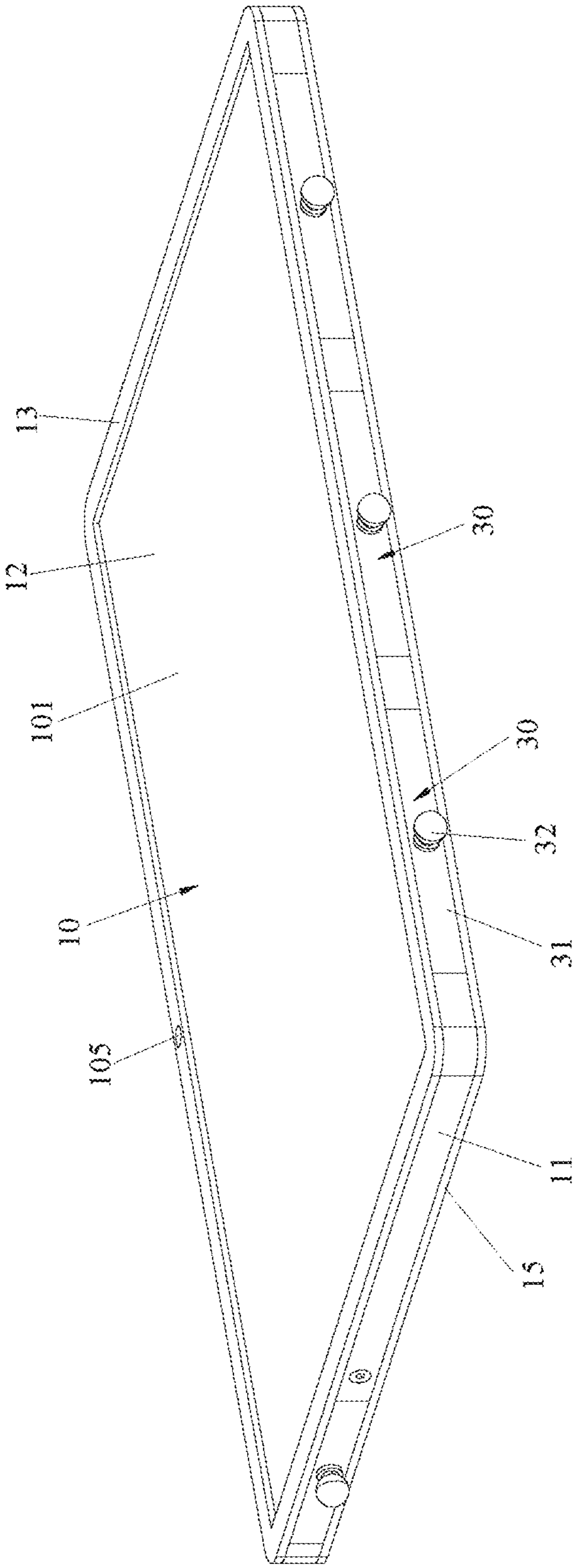
FIG. 1 is a schematic perspective view of an assembled preferred embodiment according to the present disclosure from one angle.
Figure 2:
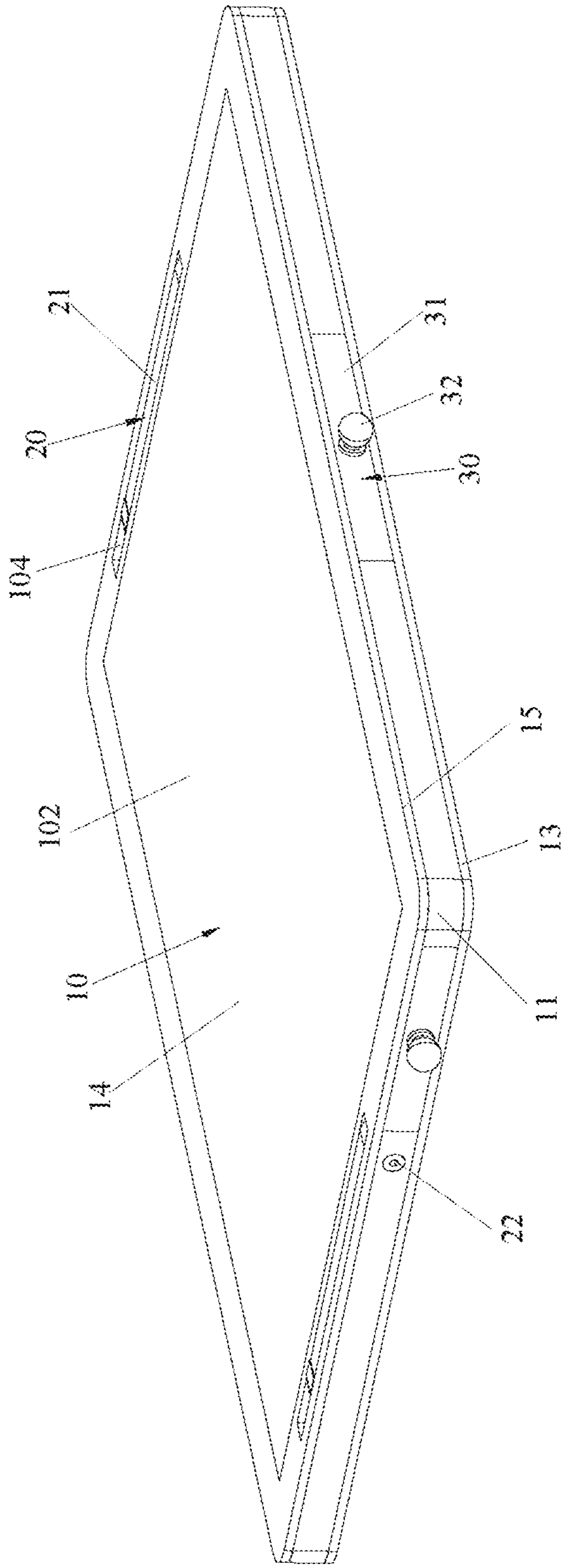
FIG. 2 is a schematic perspective view of an assembled preferred according to the present disclosure from another angle.
Figure 3:
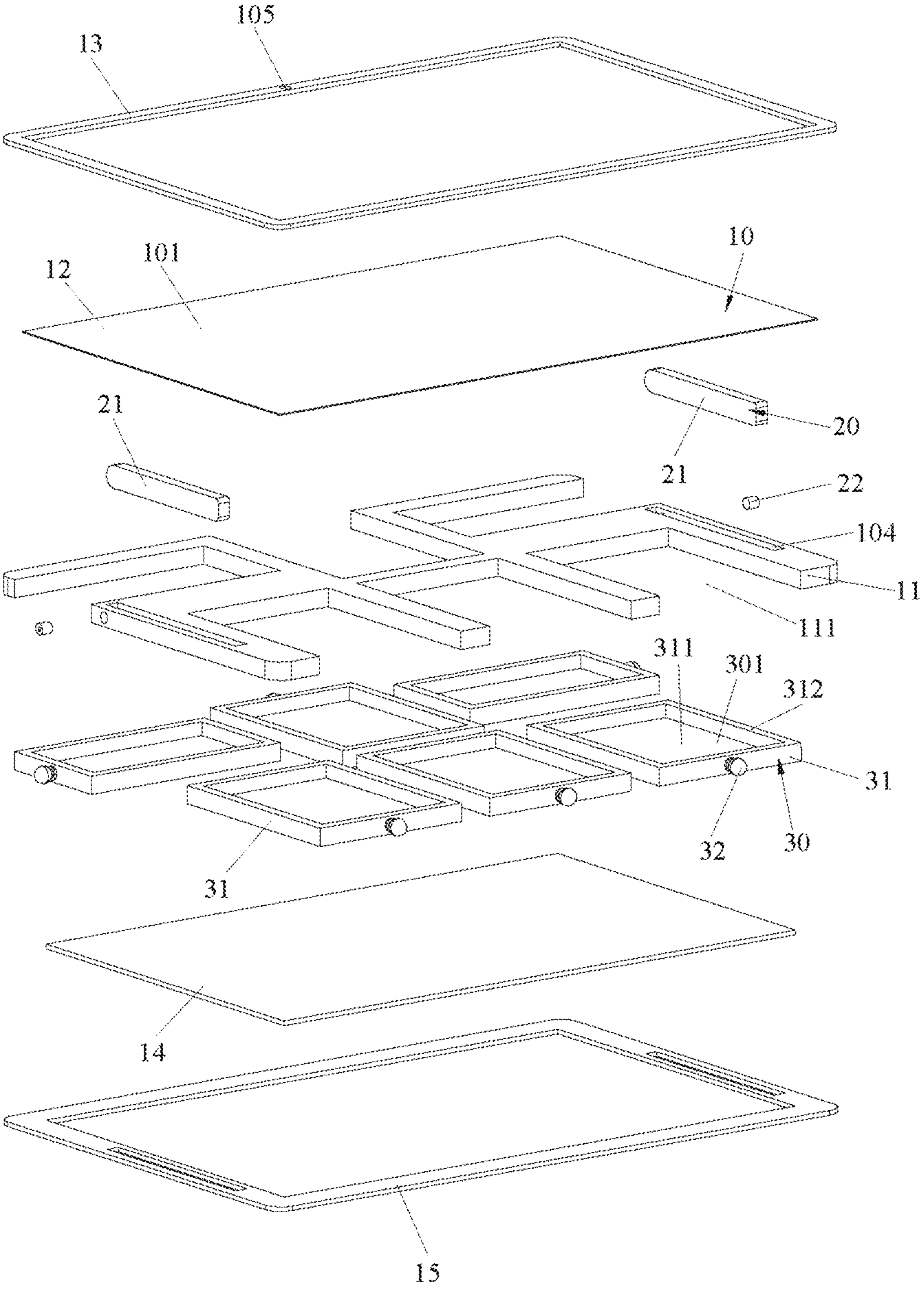
FIG. 3 is an exploded view of a preferred embodiment according to the present disclosure from one angle.
Figure 4:
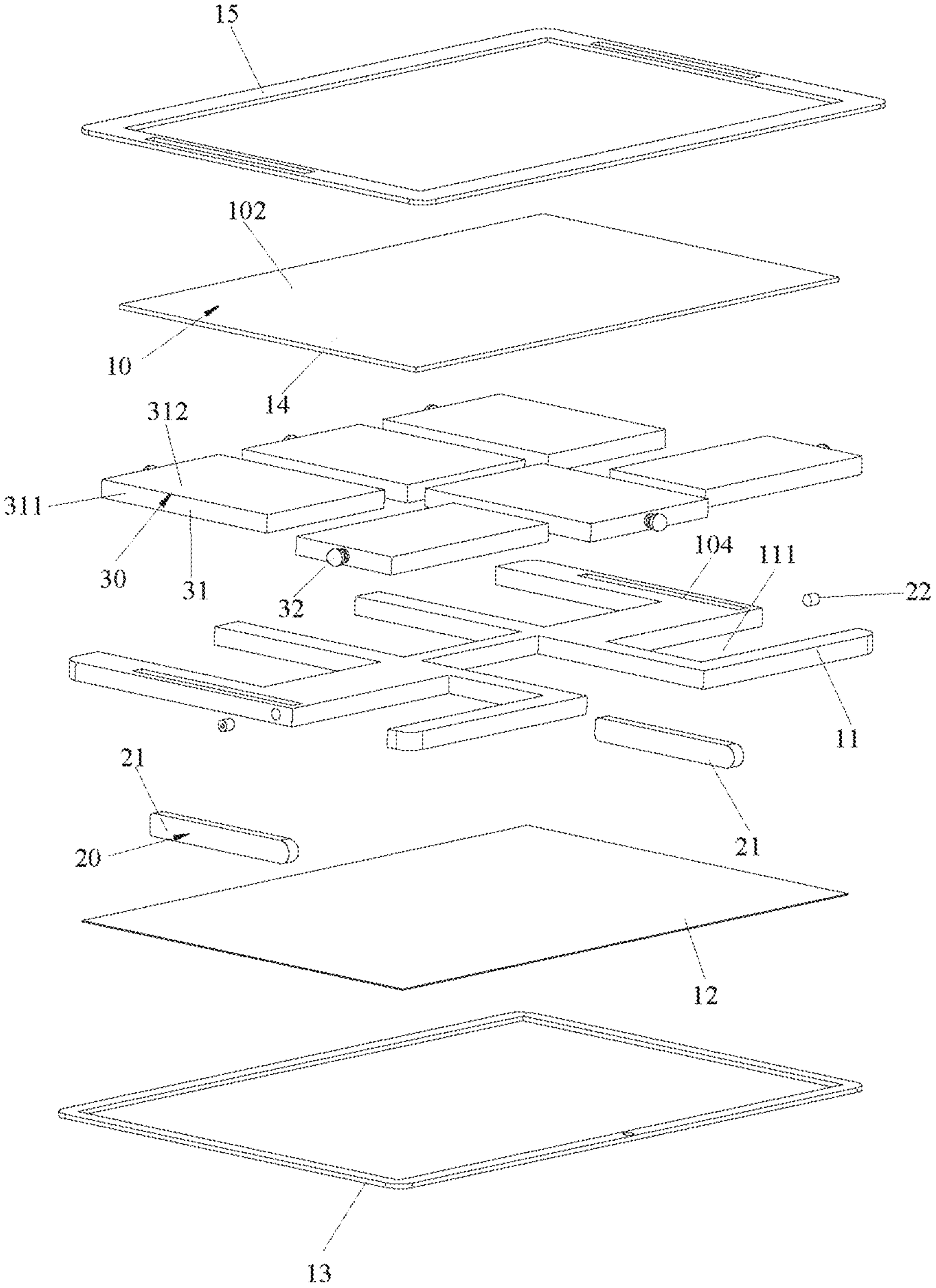
FIG. 4 is an exploded view of a preferred embodiment according to the present disclosure from another angle.
Figure 5:
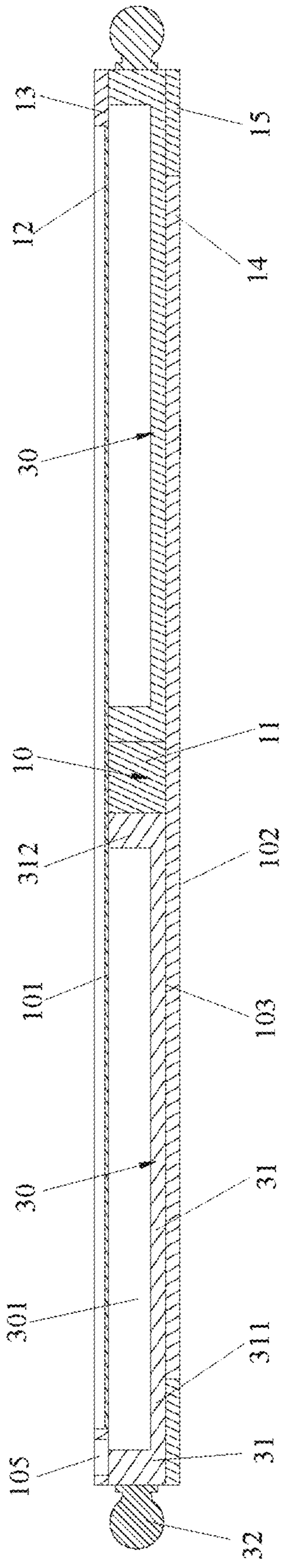
FIG. 5 is a sectional view of a preferred embodiment according to the present disclosure.
Figure 6:
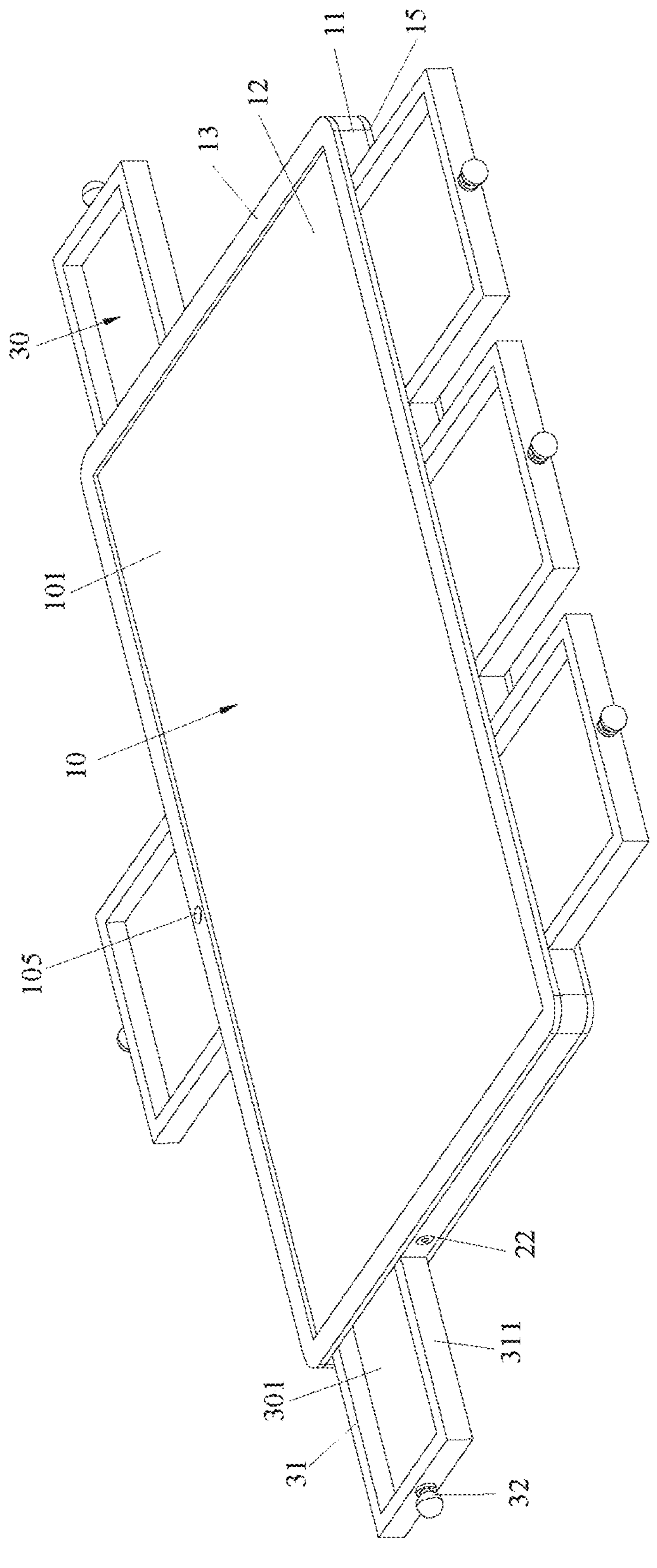
FIG. 6 is a perspective view illustrating a storage box in an open state of a preferred embodiment according to the present disclosure.
Figure 7:
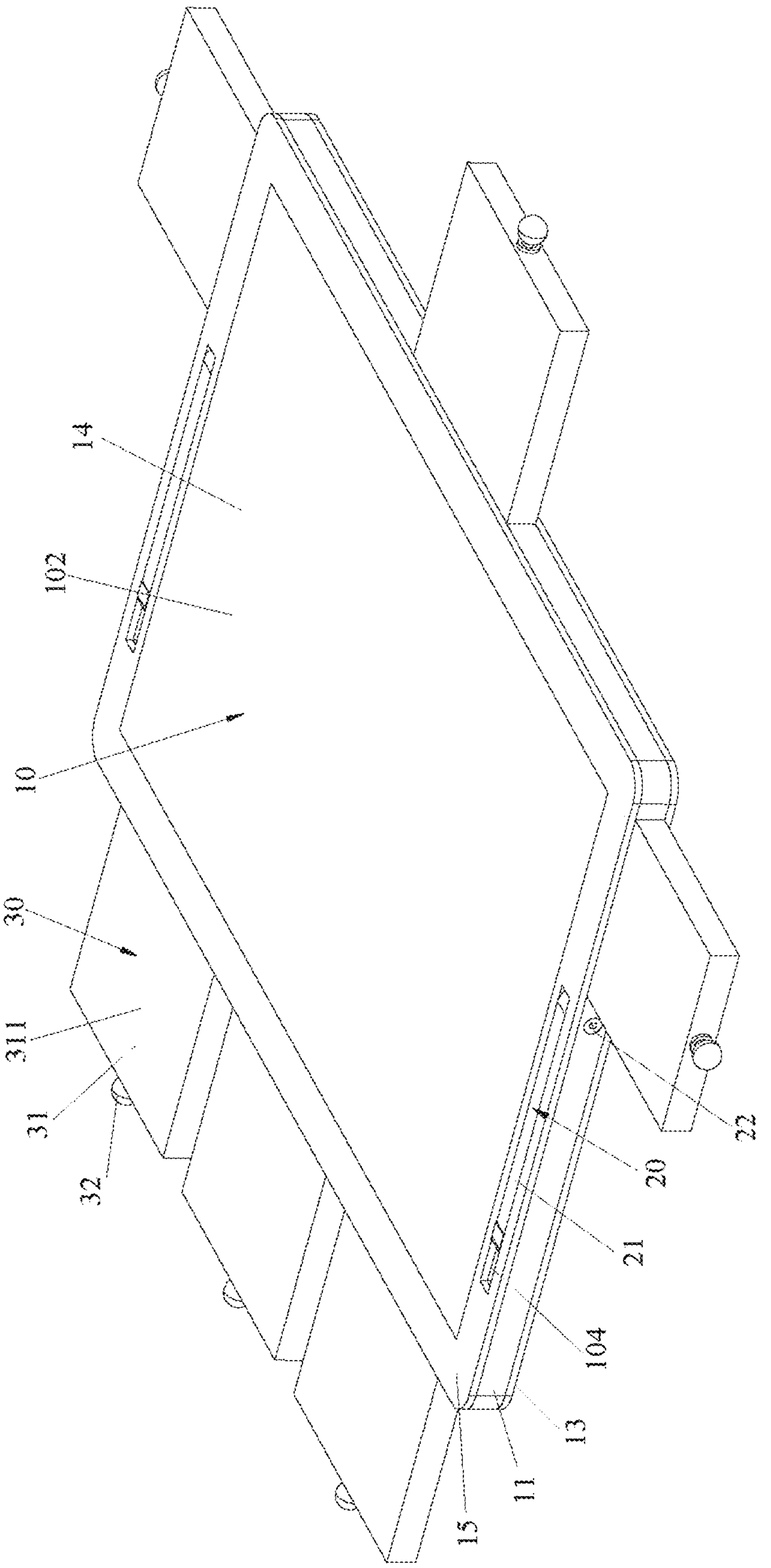
FIG. 7 is a schematic diagram of FIG. 6 from another angle.
Figure 8:
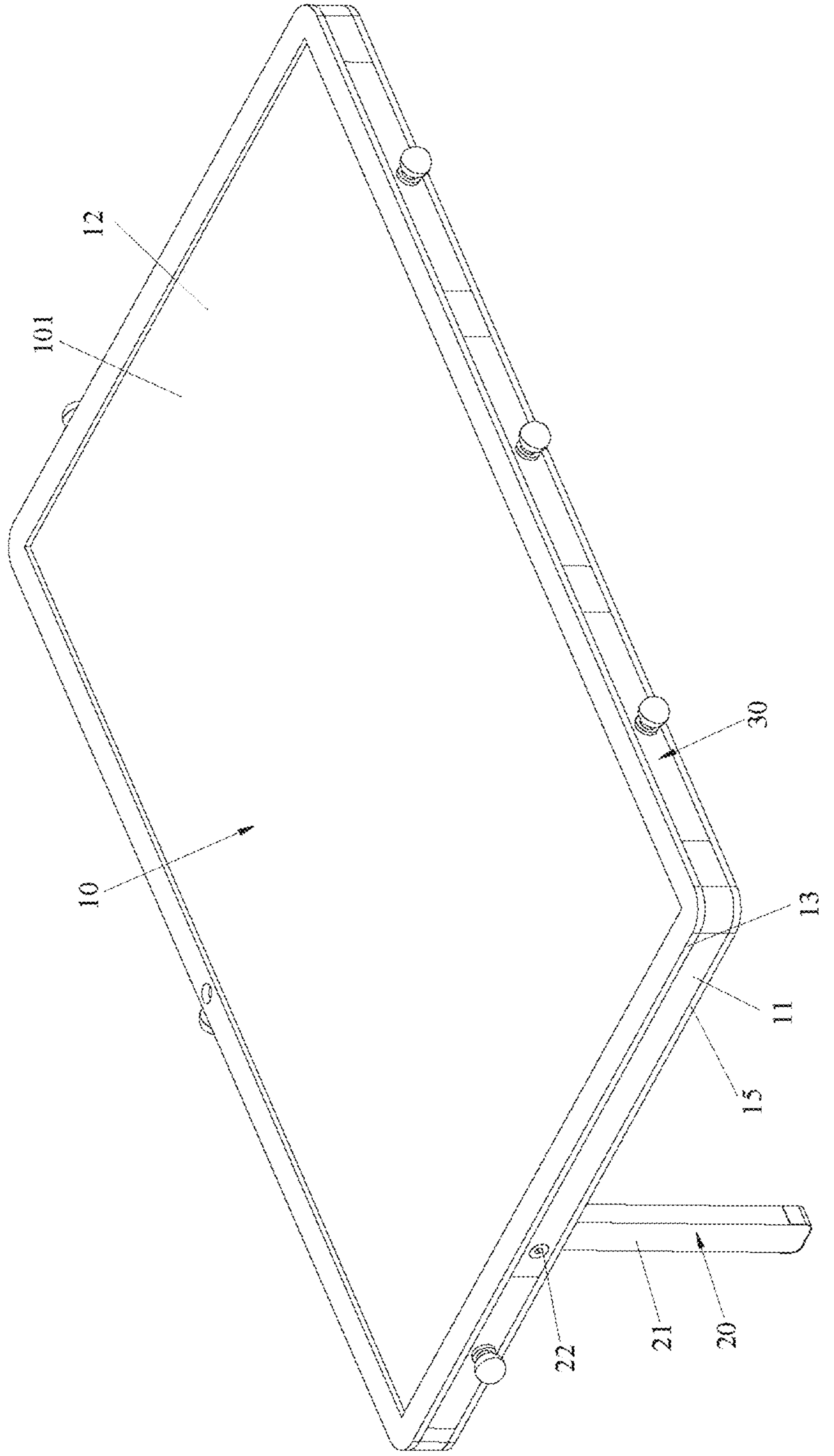
FIG. 8 is a perspective view illustrating a support stand in an unfolded state of a preferred embodiment according to the present disclosure.
Figure 9:
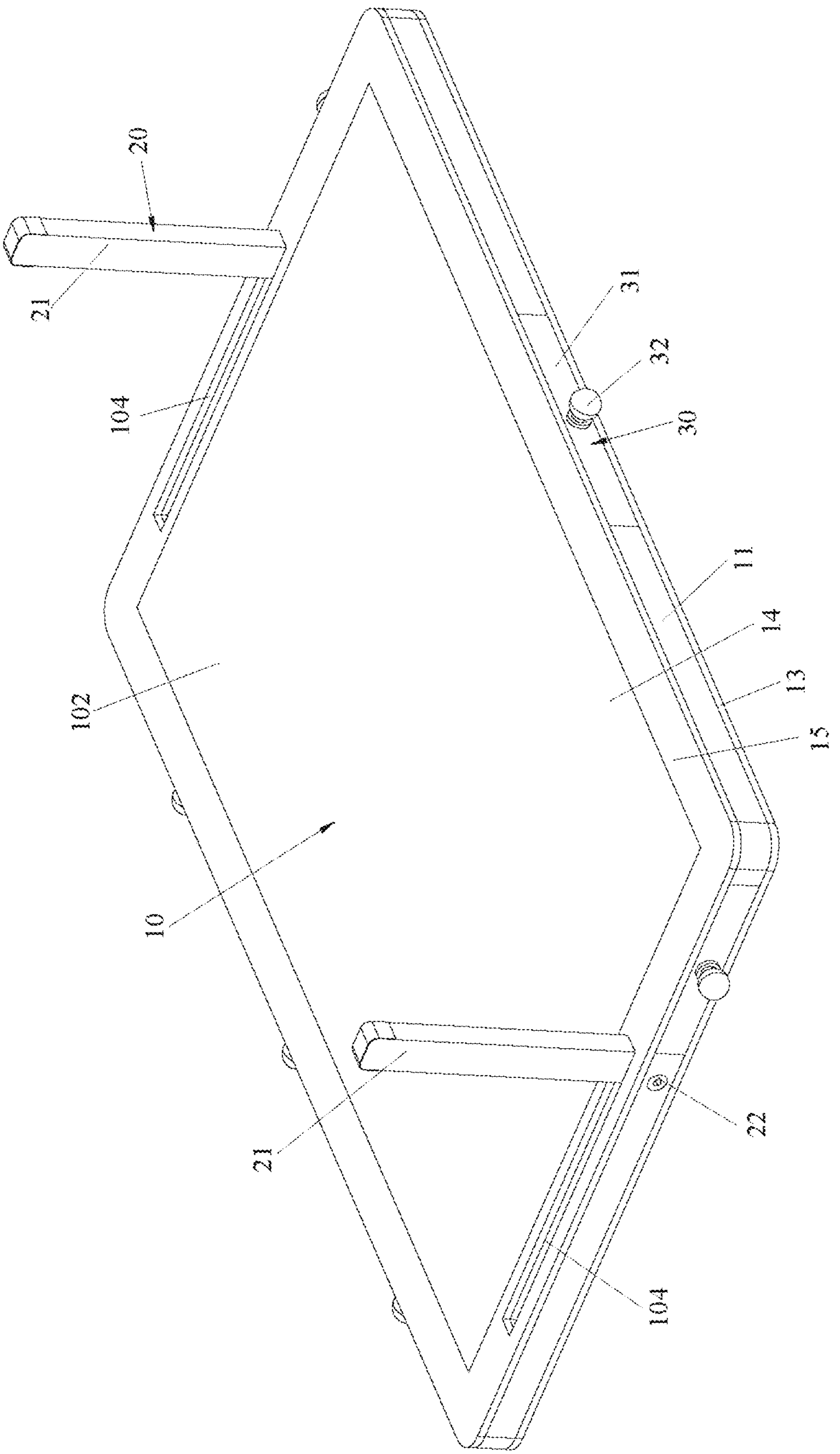
FIG. 9 is a schematic diagram of FIG. 8 from another angle.

With reference to FIGS. 1-9, a specific structure of a preferred embodiment of the present disclosure is provided, the structure includes a jigsaw puzzle board body 10, a support stand 20, and a storage box 30.

The jigsaw puzzle board body 10 is formed by four linearly extending edge portions, a first edge portion and a second edge portion are arranged opposite and parallel to each other, and a third edge portion and a fourth edge portion are also arranged opposite and parallel to each other; the four edge portions are connected end to end via four right-angle structures to form a closed geometric shape; an included angle between the first edge portion and the third edge portion is 90±0.5 degrees, and an included angle between the second edge portion and the fourth edge portion is also 90±0.5 degrees. A front of the jigsaw puzzle board body 10 is provided with a jigsaw puzzle area 101 for assembling jigsaw puzzle pieces, a rear of the jigsaw puzzle board body 10 is provided with a chalkboard area 102 for writing, and the jigsaw puzzle board body 10 is further provided with a mounting slot 103 that opens outward. Specifically:

the jigsaw puzzle board body 10 includes a middle sandwich plate 11, a front cover plate 12, a front frame 13, a rear cover plate 14, and a rear frame 15; where a notch 111 is formed on a peripheral edge of the middle sandwich plate 11; the front cover plate 12 and the front frame 13 are securely attached to a front of the middle sandwich plate 11, an outer surface of the front cover plate 12 defines the jigsaw puzzle area 101, the front frame 13 surrounds a periphery of the front cover plate 12, and an outer surface of the front frame 13 protrudes beyond the outer surface of the front cover plate 12; and the rear cover plate 14 and the rear frame 15 are securely attached to a rear of the middle sandwich plate 11, an outer surface of the rear cover plate 14 defines the chalkboard area 102, the rear frame 15 surrounds a periphery of the rear cover plate 14, and the front cover plate 12, the front frame 13, the rear cover plate 14 and the rear frame 15 respectively cover front and rear openings of the notch 111 to form the mounting slot 103. Further, a plurality of the notches 111 are provided, and are spaced and distributed on the peripheral edge of the middle sandwich plate 11, and correspondingly, a plurality of the mounting slots 103 are formed. The front cover plate 12 is made of a durable, smooth-surfaced, eco-friendly board, ensuring that jigsaw puzzle pieces are capable of fitting snugly and are easy to splice. The front cover plate 12 has a moderate thickness, providing sufficient strength to prevent deformation without being overly heavy to affect children's use. A surface of the front cover plate 12 is specially treated to have some friction force, such that the jigsaw puzzle pieces are not easy to slide off. Moreover, edges of the front cover plate 12 are rounded to prevent injury to avoid scratching children's skin, and the front cover plate 12 may be made of eco-friendly high-density fiberboard. The outer surface of the rear cover plate 14 is coated with magnetic chalkboard paint 141, chalk or magnetic teaching aids can be used for writing and painting to satisfy children's desire for doodling creation. The magnetic chalkboard paint 141 is evenly applied, securely adhered, and not easy to peel off. The chalkboard area 102 is slightly lower than a central surface, forming a shallow groove to prevent chalk dust from scattering to other parts of the jigsaw puzzle board and facilitate cleaning. The rear cover plate 14 can be made of iron plate or a composite material coated with magnetic material to achieve the magnetic chalkboard function. The front frame 13 and the rear frame 15 are both injection-molded from plastic materials. The front frame 13 and the rear frame 15 can be both made of ABS plastic, which exhibits excellent strength, toughness, and processability, and is non-toxic and odorless. The front frame 13 and the rear frame 15 are lightweight and durable. The front frame 13 and the rear frame 15 are tightly joined by means of snap-fit slots or adhesives to ensure the stability of an overall structure, and the front frame 13 and the rear frame 15 are provided with some decorative elements, such as cartoon patterns or colorful lines, to increase the attractiveness of the product. In addition, one recessed slot 104 is formed on each of left and right sides of the rear of the jigsaw puzzle board body 10. Further, a chalkboard hanging hole 105 is formed on a front edge of the jigsaw puzzle board body 10.

Overall dimensions of the jigsaw puzzle board body 10 are 500 mm in length, 350 mm in width, and 15 mm in thickness, making it suitable for children to handle with both hands easy to store and carry. When the jigsaw puzzle board body 10 is manufactured, the front cover plate 12 is processed and formed by cutting, sanding, surface treatment and other processes. The rear cover plate 14 is fabricated using spray painting or film-laminating processes. The middle sandwich plate 11, the front frame 13, and the rear frame 15 are assembled and fixed using adhesive after injection molding.

The support stand 20 is foldably arranged on a side of the jigsaw puzzle board body 10. Specifically, the support stand 20 includes two support rods 21, the two support rods 21 are respectively adapted to the two recessed slots 104, and can be arranged in the two recessed slots 104 in a folded or unfolded manner, a first end of each of the two support rods 21 is hinged with the jigsaw puzzle board body 10 via a respective pivot shaft 22, such that a concealed structure is formed. When a tilting jigsaw puzzling function or a chalkboard function is needed, the two support rods 21 can be unfolded manually, the two support rods 21 are foldable and adjustable in angle, such that the jigsaw puzzle board body 10 can be stabilized and forms a desirable tilt angle (such as 30°-45°) relative to a table surface, convenient for children to play the jigsaw puzzle. When a chalkboard surface is used and wall mounting is required, the support stand 20 may be folded, and the jigsaw puzzle board body 10 can be hung on a wall using the chalkboard hanging hole 105 and a hook, functioning like an ordinary chalkboard. The two support rods 21 may be made of aluminum alloy, which is light in weight but high in strength, ensuring stable support.

When being fully extended, the support stand 20 has a length of 150 mm, enabling the jigsaw puzzle board body 10 to achieve a tilt angle of 30°-45°, meeting the needs of comfortable jigsaw puzzle pieces play. The support stand 20 is fabricated via metal processing techniques such as stamping, bending, and welding, and the recessed slots 104 are integrally formed during the frame injection molding.

A storage box 30 is slidably arranged in the mounting slot 103 and can be pulled outward, and the storage box 30 is provided with a storage compartment 301 for holding various items. A plurality of the storage boxes 30 are provided, and are respectively mounted in a respective mounting slot 103. Specifically, the storage box 30 includes a box body 31 and a handle 32; where the box body 31 is integrally molded, and includes a base plate portion 311 and a plurality of side plate portions 312, the plurality of side plate portions 312 extend upward from respective edges of the base plate portion 311, and the plurality of side plate portions 312 are connected end to end in sequence and enclosed to form the storage compartment 301. The box body 31 may be made of the same or similar material as the jigsaw puzzle board body 10 to ensure overall coordination. An opening orientation of the box body 31 can be determined reasonably according to a design layout of the jigsaw puzzle board, such that children can take items easily; and the handle 32 is fixed to an outer side face of the box body 31. In addition, dividers (not shown in the figures) may be used to divide an interior of the storage box 30 into a plurality of small compartments for storing jigsaw puzzle pieces of different shapes and sizes, as well as pens, chalks, chalkboard erasers, and other accessories. A plurality of the dividers are arranged horizontally and vertically inside the storage box 30, and heights of the dividers are tailored to sizes of the stored items, and a storage space is divided into areas specifically storing jigsaw puzzle pieces, paintbrushes, chalks, chalkboard erasers, and the like, to prevent the items from being mixed and damaged by collision. The storage box 30 may also be provided with a detachable lid (not shown in the figures). When being closed, the lid is flush with a surface of the puzzle board, without affecting an overall appearance and use. When being opened, the items inside can be easily taken out. The lid is made of flexible plastic or rubber material, one side of the lid is connected to an edge of the storage box 30 via a rotating shaft, allowing for free rotation. A snap-fit latch or a magnetic suction device is arranged on the other side of the lid to ensure that the lid closes can fit tightly to the storage box 30 and prevents items from falling out. A surface of the lid may be printed with graphics or logos related to a theme of the jigsaw puzzle board to play a decorative role. The storage box 30 may be made of the material same as that of the frames or made of flexible rubber, and the lid is made of the rubber to ensure good sealing and cushioning effects.

The internal small compartments of the storage box 30 are dimensioned according to dimensions of common jigsaw puzzle piece and accessories, such as paintbrushes. For example, a largest jigsaw puzzle piece storage compartment may be 100 mm in length, 50 mm in width, and 30 mm in height, and a paintbrush storage compartment has a diameter of 20 mm. The storage box 30 is formed simultaneously when the jigsaw puzzle board body 10 is injection-molded, and the dividers are fixed via secondary injection molding or subsequent assembly, and the magnetic suction device or the snap-fit latch is mounted on the lid after being molded.

A usage method of this embodiment is described in detail as follows:

When puzzling is desired, a child pulls out the storage box 30 and takes out jigsaw puzzle pieces from the storage box 30, and then places the jigsaw puzzle pieces on the jigsaw puzzle area 101. When the jigsaw puzzle board needs to be tilted, the support rods 21 on both sides are manually pulled out from the recessed slots 104, and adjusted to a desirable tilt angle and then fixed, in this case, the child can sit at a table to put together the jigsaw puzzle pieces on the tilted jigsaw puzzle area 101 at a comfortable viewing angle to complete the puzzling.

When doodling and writing are required, the jigsaw puzzle board is flipped over to make the chalkboard face up. When there is enough space and the child likes to ply on a tabletop, the support rods 21 on both sides can also be pulled out to cause the jigsaw puzzle board to be titled at a desirable angle. When it is necessary to save a space on the tabletop or simulate a classroom chalkboard, the support stand 20 can be folded away, and the jigsaw puzzle board can be hung on a wall using the chalkboard hanging hole 105, in this case, the child can write or draw on the chalkboard area 102 using a chalk or magnetic teaching tools. After writing and drawing, the chalkboard area 102 can be wiped clean using a chalkboard eraser, and chalk dust will fall into a shallow groove around the chalkboard, which is convenient for cleanup.

Upon completion of the jigsaw puzzling, the child can classify the jigsaw puzzle pieces by shape and size, and put them into the respective compartments in the storage box 30, accessories such as pens, chalks, and chalkboard erasers can also be put back in place, and the storage box 30 is then pushed back into the mounting slot 103, such that the jigsaw puzzle board and all the accessories are neatly stored together, preventing loss and ensuring readiness for subsequent use.

Design focus of the present disclosure is as follows: by arranging a jigsaw puzzle area on the front, and a chalkboard area on the rear of the jigsaw puzzle board body, the product perfectly combines jigsaw puzzle function and blackboard-writing function, thereby meeting various fund and learning needs of children with a single product, increasing the utilization rate as a toy, and saving costs for parents to purchase various single-function toys. In addition, by introducing the support stand, the product can be adjusted to conform to ergonomic principles for children, effectively alleviating neck strain caused by bending down to assemble jigsaw puzzle pieces for an extended period of time, and improving the view of assembling jigsaw puzzle pieces, as well as comfort and concentration of children, and cultivating patience and concentration of children. In addition, by introducing the storage box, jigsaw puzzle pieces and accessories can be stored in the storage box to avoid loss, fostering good storage habits and maintaining a home environment tidier and more orderly. The product can be used both on the tabletop or hung on the wall, making it adaptable to different usage scenarios, and convenient for use in places living room, children's room, or classroom.

The technical principle of the present disclosure is described above in combination with specific embodiments. The description is only for the purpose of illustrating the principle of the present disclosure and is not to be construed in any way as limiting the protection scope of the present disclosure. On the basis of explanations herein, those skilled in the art can devise other specific implementations of the present disclosure without inventive efforts, which fall within the protection scope of the present disclosure.

What is claimed is:

1. A multifunctional jigsaw puzzle board for children, comprising a jigsaw puzzle board body and a storage box;

wherein the jigsaw puzzle board body is formed by four linearly extending edge portions, and the four linearly extending edge portions comprises a first edge portion, a second edge portion, a third edge portion, and a fourth edge portion;

wherein the first edge portion and the second edge portion are arranged opposite and parallel to each other, and the third edge portion and the fourth edge portion are also arranged opposite and parallel to each other;

wherein the four linearly extending edge portions are connected end to end via four right-angle structures to form a closed geometric shape;

wherein an included angle between the first edge portion and the third edge portion is 90±0.5 degrees, and an included angle between the second edge portion and the fourth edge portion is also 90±0.5 degrees;

wherein a front of the jigsaw puzzle board body is provided with a jigsaw puzzle area for assembling jigsaw puzzle pieces, a rear of the jigsaw puzzle board body is provided with a chalkboard area for chalkboard writing, and the jigsaw puzzle board body is further provided with a mounting slot that opens outward;

wherein the storage box is slidably arranged in the mounting slot and is pulled outward, and the storage box is provided with a storage compartment for holding various items;

wherein the jigsaw puzzle board body comprises a middle sandwich plate, a front cover plate, a front frame, a rear cover plate, and a rear frame;

wherein a notch is formed on a peripheral edge of the middle sandwich plate;

wherein the front cover plate and the front frame are securely attached to a front of the middle sandwich plate, an outer surface of the front cover plate is configured to define the jigsaw puzzle area, the front frame is configured to surround a periphery of the front cover plate, and an outer surface of the front frame is configure to protrude beyond the outer surface of the front cover plate;

wherein the rear cover plate and the rear frame are securely attached to a rear of the middle sandwich plate, an outer surface of the rear cover plate is configured to define the chalkboard area, the rear frame is configured to surround a periphery of the rear cover plate; and wherein the front cover plate, the front frame, the rear cover plate and the rear frame are respectively configured to cover front and rear openings of the notch to form the mounting slot.

2. The multifunctional jigsaw puzzle board for children according to claim 1, further comprising a support stand, wherein the support stand is foldably arranged on a side of the jigsaw puzzle board body.

3. The multifunctional jigsaw puzzle board for children according to claim 1, wherein the front cover plate is made of a durable, smooth-surfaced, and eco-friendly plate.

4. The multifunctional jigsaw puzzle board for children according to claim 1, wherein the outer surface of the rear cover plate is coated with magnetic chalkboard paint.

5. The multifunctional jigsaw puzzle board for children according to claim 1, wherein the front frame and the rear frame are both injection-molded from plastic materials.

6. The multifunctional jigsaw puzzle board for children according to claim 1, wherein a plurality of the notches are provided, and are spaced and distributed on the peripheral edge of the middle sandwich plate, a plurality of the mounting slots are formed, and one storage box is arranged in each of the mounting slots.

7. The multifunctional jigsaw puzzle board for children according to claim 2, wherein one recessed slot is formed on each of left and right sides of the rear of the jigsaw puzzle board body; and the support stand comprises two support rods, the two support rods are respectively adapted to the two recessed slots, and are arranged in the two recessed slots in a folded or unfolded manner, and a first end of each of the two support rods is hinged with the jigsaw puzzle board body via a respective pivot shaft.

8. The multifunctional jigsaw puzzle board for children according to claim 1, wherein the storage box comprises a box body and a handle; wherein the box body is integrally molded, and comprises a base plate portion and a plurality of side plate portions, the plurality of side plate portions extend upward from respective edges of the base plate portion, and the plurality of side plate portions are connected end to end in sequence and enclosed to form the storage compartment; and the handle is fixed to an outer side face of the box body.

9. The multifunctional jigsaw puzzle board for children according to claim 1, wherein a chalkboard hanging hole is formed on a front edge of the jigsaw puzzle board body.

* * * * *